(12) United States Patent
Lee et al.

(10) Patent No.: US 9,379,383 B2
(45) Date of Patent: Jun. 28, 2016

(54) LITHIUM BATTERY AND METHOD OF PREPARING THE SAME

(71) Applicants: Electronics and Telecommunications Research Institute, Daejeon (KR); UNIST Academy-Industry Research Corporation, Ulsan (KR)

(72) Inventors: Young-Gi Lee, Daejeon (KR); Kwang Man Kim, Daejeon (KR); Kunyoung Kang, Daejeon (KR); Dong Ok Shin, Daejeon (KR); Yoon Seok Jung, Ulsan (KR); Bum Ryong Shin, Pohang-si (KR)

(73) Assignees: ELECTRONICS AND TELECOMMUNICATIONS RESEARCH INSTITUTE, Daejeon (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 175 days.

(21) Appl. No.: 14/264,804

(22) Filed: Apr. 29, 2014

(65) Prior Publication Data

US 2014/0370398 A1    Dec. 18, 2014

(30) Foreign Application Priority Data

Jun. 17, 2013 (KR) .................. 10-2013-0069090
Dec. 10, 2013 (KR) .................. 10-2013-0153192

(51) Int. Cl.
*H01M 4/58*      (2010.01)
*H01M 10/0562*   (2010.01)
(Continued)

(52) U.S. Cl.
CPC ............ *H01M 4/5815* (2013.01); *H01M 4/043* (2013.01); *H01M 4/136* (2013.01);
(Continued)

(58) Field of Classification Search
CPC .......... H01M 4/5815; H01M 10/0562; H01M 10/052
See application file for complete search history.

(56) References Cited

U.S. PATENT DOCUMENTS

2011/0065007 A1\* 3/2011 Kamiya ............ H01M 10/0562
                                                 429/322
2011/0159365 A1\* 6/2011 Loveness ............ H01M 4/0428
                                                 429/218.1

FOREIGN PATENT DOCUMENTS

JP    2011-187253 A    9/2011
JP    2012-146507 A    8/2012
(Continued)

OTHER PUBLICATIONS

Akitoshi Hayashi, et al., "Amorphous Titanium Sulfide Electrode for All-solid-state Rechargeable Lithium Batteries with High Capacity", Chem. Lett, vol. 41, pp. 886-888, Aug. 25, 2012.

(Continued)

*Primary Examiner* — Stewart Fraser
(74) *Attorney, Agent, or Firm* — Rabin & Berdo, P.C.

(57) ABSTRACT

A method of preparing a lithium battery according to an embodiment of the present invention may include preparing a mixture including lithium phosphorus sulfide and metal sulfide, preparing an electrode composite by applying a physical pressure to the mixture, wherein the electrode composite includes lithium phosphorus sulfide, lithium metal sulfide, and amorphous sulfide, preparing an electrode active layer by using the electrode composite, forming an electrode current collector on one side of the electrode active layer, and forming an electrolyte layer on another side of the electrode active layer.

8 Claims, 4 Drawing Sheets

(51) Int. Cl.
*H01M 10/052* (2010.01)
*H01M 4/04* (2006.01)
*H01M 4/136* (2010.01)
*H01M 4/36* (2006.01)

(52) U.S. Cl.
CPC .......... *H01M 4/366* (2013.01); *H01M 10/052* (2013.01); *H01M 10/0562* (2013.01); *Y02E 60/122* (2013.01); *Y02T 10/7011* (2013.01); *Y10T 29/49115* (2015.01)

(56) References Cited

FOREIGN PATENT DOCUMENTS

| | | |
|---|---|---|
| JP | 2013-080637 A | 5/2013 |
| JP | 2013-093126 A | 5/2013 |
| KR | 10-2012-0103378 A | 9/2012 |

OTHER PUBLICATIONS

James E. Trevey, et al., "High Power Nanocomposite TiS2 Cathodes for All-Solid-State Lithium Batteries", Journal of the Electrochemical Society, vol. 158, pp. A 1282-A 1289, Oct. 31, 2011.

Thomas A. Yersak, et al., "Electrochemical Evolution of an Iron Sulfide and Sulfur Based Cathode for All-Solid-State Li-Ion Batteries", Journal of the Electrochemical Society, vol. 160, A 1009-A 1015, Apr. 26, 2013.

Motohiro Nagao, et al., "High-capacity $Li_2S$-nanocarbon composite electrode for all-solidstate rechargeable lithium batteries", Journal of Materials Chemistry, vol. 22, pp. 10015-10020, Mar. 15, 2012.

\* cited by examiner

LITHIUM BATTERY AND METHOD OF PREPARING THE SAME

CROSS-REFERENCE TO RELATED APPLICATIONS

This U.S. non-provisional patent application claims priority under 35 U.S.C. §119 of Korean Patent Application Nos. 10-2013-0069090, filed on Jun. 17, 2013, and 10-2013-0153192, filed on Dec. 10, 2013, the entire contents of which are hereby incorporated by reference.

BACKGROUND

The present invention disclosed herein relates to lithium batteries, and more particularly, to electrode composites for a lithium battery.

Interests in lithium batteries have significantly grown as the importance of energy storage and conversion techniques has increased. Lithium batteries may include an anode, a separator, a cathode, and an electrolyte. The electrolyte acts as a medium in which ions may move between the cathode and the anode. Since energy densities of the lithium batteries may be relatively higher than those of other types of batteries, research and development of lithium batteries have been actively conducted. Recently, lithium batteries are also used in electric vehicles as well as portable electronic devices such as smartphones or notebooks. With respect to medium and large lithium batteries, excellent performance and stability are required due to harsh operating environments.

A lithium battery electrolyte may include an organic-based liquid electrolyte and an inorganic-based solid electrolyte. The organic-based liquid electrolyte has a lithium salt dissolved therein and is widely used due to high ionic conductivity and stable electrochemical properties. However, a number of issues related to the safety of the organic-based liquid electrolyte have been raised due to its flammability, volatility, and leakage problem. The inorganic-based electrolyte has received attention due to high capacity, low processing costs, and stability.

SUMMARY

The present invention provides a sulfide-based electrode composite having high capacity and high ionic conductivity.

The present invention also provides a method of easily preparing a high-performance sulfide-based electrode composite.

The object of the present invention is not limited to the aforesaid, but other objects not described herein will be clearly understood by those skilled in the art from descriptions below.

Embodiments of the present invention provide methods of preparing a lithium battery including: preparing a mixture including lithium phosphorus sulfide and metal sulfide, preparing an electrode composite by applying a physical pressure to the mixture, wherein the electrode composite includes lithium phosphorus sulfide, lithium metal sulfide, and amorphous sulfide, preparing an electrode active layer by using the electrode composite, forming an electrode current collector on one side of the electrode active layer, and forming a solid electrolyte layer on another side of the electrode active layer.

In some embodiments, the lithium metal sulfide and the amorphous sulfide may be prepared by reacting metal sulfide with a lithium element which is included in the mixture, and the reacting of the metal sulfide with the lithium element may be performed by the physical pressure.

In other embodiments, the lithium phosphorus sulfide included in the electrode composite is provided from a portion of the lithium phosphorus sulfide included in the mixture which does not react and remains.

In still other embodiments, the applying of the physical pressure to the mixture may be performed by a ball milling process.

In even other embodiments, the lithium phosphorus sulfide may include $Li_3PS_4$, and the metal sulfide may include $TiS_2$.

In yet other embodiments, the electrode active layer may include: first parts including lithium metal sulfide and electrically connected to the electrode current collector; second parts including lithium phosphorus sulfide and connected to the solid electrolyte layer; and the amorphous sulfide provided between the first parts and the second parts.

In further embodiments, the amorphous sulfide may include lithium, metal, phosphorus, and sulfur.

In other embodiments of the present invention, methods of preparing a lithium battery include: preparing a mixture including lithium sulfide, phosphorus sulfide, metal, and sulfur; preparing an electrode composite by applying a physical pressure to the mixture, wherein the electrode composite includes lithium phosphorus sulfide, lithium metal sulfide, and amorphous sulfide; preparing an electrode active layer by using the electrode composite; forming an electrode current collector on one side of the electrode active layer; and forming an electrolyte layer on another side of the electrode active layer.

In still other embodiments of the present invention, lithium batteries include: an electrode current collector; a solid electrolyte layer that is disposed and spaced apart from the electrode current collector; and an electrode active layer disposed between the electrode current collector and the solid electrolyte layer and including: first parts including lithium metal sulfide and electrically connected to the electrode current collector; second parts including lithium phosphorus sulfide and connected to the solid electrolyte layer; and amorphous sulfide provided between the first parts and the second parts and including lithium, metal, phosphorus, and sulfur.

In some embodiments, the solid electrolyte layer may include the same material as the second parts.

In other embodiments, the first parts may be connected to the second parts.

In still other embodiments, the first parts are provided to be dispersed in the electrode active layer and are connected to one another.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
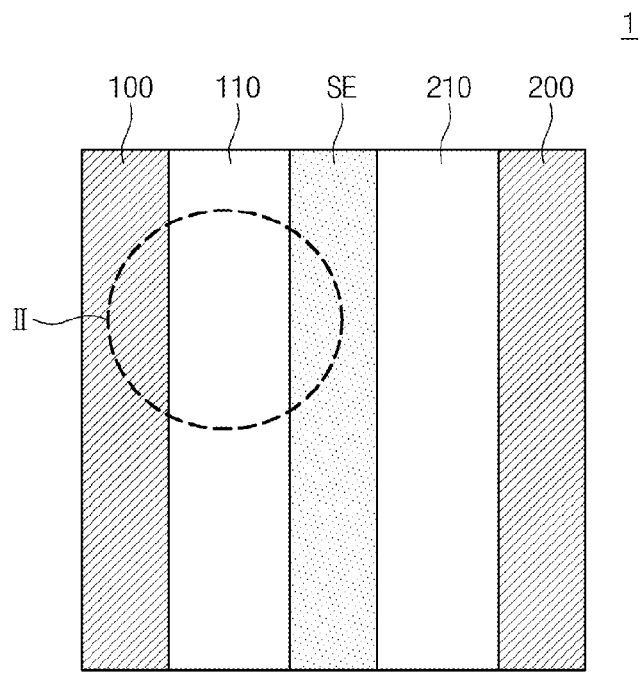
FIG. 1 is a cross-sectional view illustrating a lithium battery according to an embodiment of the present invention.

Preferred embodiments of the present invention will be described below in more detail with reference to the accompanying drawings in order to fully understand the constitution and effect of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Those skilled in the art will understand that the present inventive concept can be implemented in an appropriate environment.

In the following description, the technical terms are used only for explaining a specific exemplary embodiment while not limiting the present invention. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components.

In addition, it will be understood that when an element such as a layer, film, region, or substrate is referred to as being "on" another element, it can be directly on the other element or intervening elements may also be present.

Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof. Like reference numerals refer to like elements throughout.

Unless otherwise defined, all terms used herein have the same meaning as commonly understood by one of ordinary skill in the art to which this inventive concept belongs.

Hereinafter, a lithium battery according to the present invention will be described.

Figure 2:
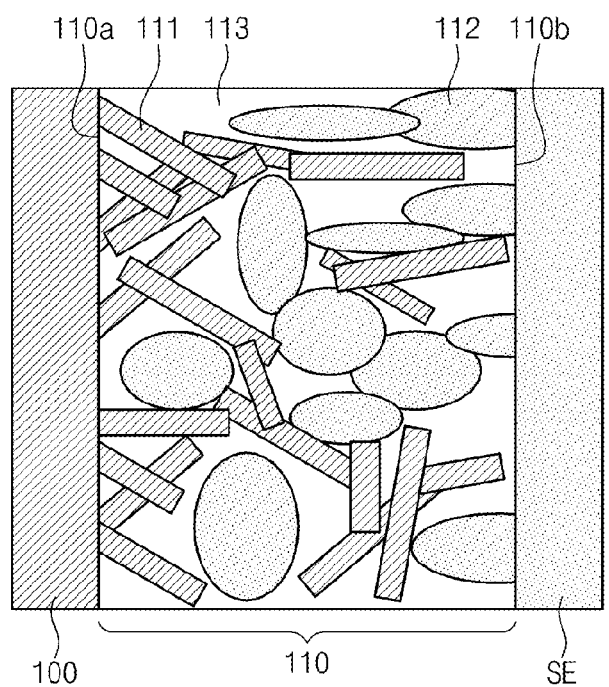
FIG. 2 is an enlarged view illustrating region "II" of FIG. 1.

FIG. 1 is a cross-sectional view illustrating a lithium battery according to an embodiment of the present invention. FIG. 2 is an enlarged view illustrating region "II" of FIG. 1.

Referring to FIG. 1, a lithium battery 1 may include a first electrode current collector 100, a first electrode active layer 110, a solid electrolyte layer SE, a second electrode active layer 210, and a second electrode current collector 200. Any one of a first electrode 100 and 110 and a second electrode 200 and 210 may be an anode and the other one may be a cathode.

The first electrode current collector 100 may be spaced apart from the second electrode current collector 200. The first electrode current collector 100 and the second electrode current collector 200 may include an electrically conductive material.

The solid electrolyte layer SE may be disposed between the first electrode current collector 100 and the second electrode current collector 200. The solid electrolyte layer SE may include a lithium ion conductive material. The solid electrolyte layer SE may include a material expressed by $Li_aM_bP_cS_4$, where M is any one of boron (B), aluminum (Al), gallium (Ga), indium (In), silicon (Si), germanium (Ge), tin (Sn), lead (Pb), antimony (Sb), bismuth (Bi), titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), and tungsten (W), $2.0 \leq a \leq 5.0$, $0 \leq b \leq 0.5$, and $0.5 \leq c \leq 1.3$. For example, the solid electrolyte layer SE may include thio-LISICON ($Li_{3.75}Ge_{0.25}P_{0.75}S_4$) or $Li_{10}GeP_2S_{12}$. As another example, the solid electrolyte layer SE may include lithium sulfide or sodium sulfide such as $Li_aP_cS_4$ or $Na_aP_cS_4$, where $2.0 \leq a \leq 4.0$ and $0.8 \leq c \leq 1.3$.

The first electrode active layer 110 may be disposed between the first electrode current collector 100 and the solid electrolyte layer SE. The first electrode active layer 110 may receive electrons from the first electrode current collector 100. The first electrode active layer 110 may receive lithium ions from the solid electrolyte layer SE.

Referring to FIG. 2, the first electrode active layer 110 may have one side 110a and another side 110b that are opposite to each other. The solid electrolyte layer SE may be provided on another side 110b of the first electrode active layer 110. The first electrode current collector 100 may be provided on the one side 110a of the first electrode active layer 110. The first electrode active layer 110 may include first parts 111, second parts 112, and amorphous sulfide 113. The first electrode active layer 110 may further include a carbon material (not shown).

The first parts 111 may be connected to the first electrode current collector 100. The first parts 111 may be provided to be dispersed in the first electrode active layer 110 and may be connected to one another. The first electrode current collector 100 may transfer electrons to the first electrode active layer 110 through the first parts 111. As a result, electronic conductivity at an interface between the first electrode current collector 100 and the first electrode active layer 110 may be improved. The first parts 111 may include an electrically conductive material. For example, the first parts 111 may include lithium metal sulfide, such as $Li_xTiS_2$, or sodium metal sulfide. The first parts 111 may store lithium ions in the first electrode active layer 110.

The second parts 112 may be connected to the solid electrolyte layer SE. The second parts 112 may be provided to be dispersed in the second electrode active layer 210 and may be connected to each other. The second parts 112 may be connected to the first parts 111. The second parts 112 may include the same material as the solid electrolyte layer SE. For example, the second parts 112 may include the above-described material expressed by $Li_aM_bP_cS_4$, where M is any one of B, Al, Ga, In, Si, Ge, Sn, Pb, Sb, Bi, Ti, V, Cr, Mn, Fe, Co, Ni, Cu, Y, Zr, Nb, Mo, Tc, Ru, Rh, Pd, Ag, Hf, Ta, and W, $2.0 \leq a \leq 5.0$, $0 \leq b \leq 0.5$, and $0.5 \leq c \leq 1.3$. The solid electrolyte layer SE may provide lithium ions to the first electrode active layer 110 through the second parts 112. Lithium ions may more easily move at an interface between the solid electrolyte layer SE and the first electrode active layer 110 due to the second parts 112. The second parts 112 may act as a lithium ion transfer path in the first electrode active layer 110. For example, the second parts 112 may include lithium phosphorous sulfide, such as $Li_3PS_4$, or sodium phosphorus sulfide.

Gaps between the first parts 111 and the second parts 112 in the first electrode active layer 110 may be filled with the amorphous sulfide 113. The amorphous sulfide 113 may include lithium, metal, phosphorus, and sulfur. For example, the amorphous sulfide 113 may be $Li_xTiP_yS_z$ ($0.001 \leq x \leq 10$, $0.001 \leq y \leq 5$, $0.001 \leq z \leq 20$). The amorphous sulfide 113 may store lithium ions that are transferred from the solid electrolyte layer SE.

Referring again to FIG. 1, the second electrode active layer 210 may be disposed between the second electrode current collector 200 and the solid electrolyte layer SE. The second electrode active material 210 may receive electrons from the second electrode current collector 200 and may receive lithium ions from the solid electrolyte layer SE. The second electrode active layer 210 may be the same or similar to the first electrode active layer 110.

Hereinafter, a method of preparing a lithium battery according to an embodiment of the present invention will be described.

Figure 3:
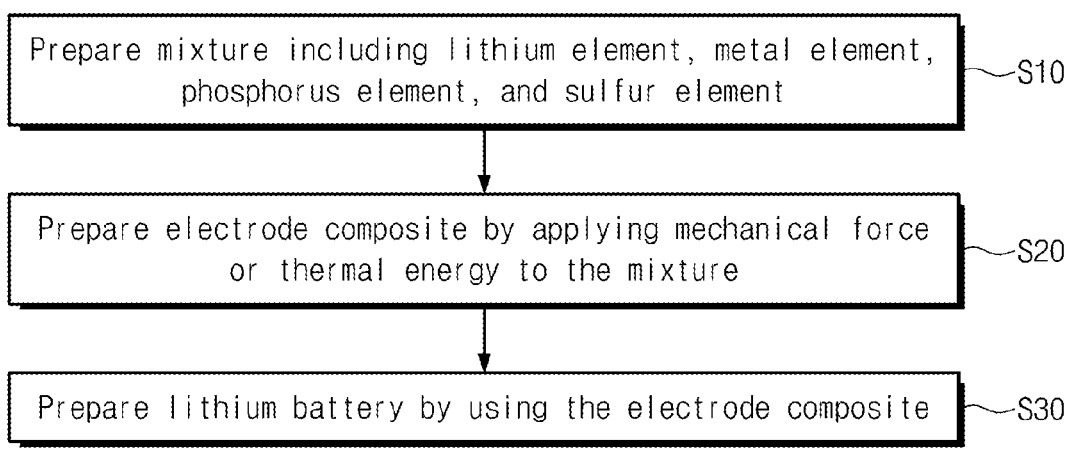
FIG. 3 is a flowchart illustrating a method of preparing a lithium battery according to an embodiment of the present invention.

FIG. 3 is a flowchart illustrating a method of preparing a lithium battery according to an embodiment of the present invention. Hereinafter, descriptions overlapping with the aforementioned descriptions will be omitted.

Referring to FIG. 3, a mixture including a lithium element, a metal element, a phosphorus element, and a sulfur element may be prepared (S10). For example, lithium phosphorus sulfide and metal sulfide may be added to prepare the mixture. The lithium phosphorus sulfide and the metal sulfide may be added at a weight ratio of 1:10 to 3:1. The lithium phosphorus sulfide may be a material expressed by $Li_aM_bP_cS_4$, where M is any one of B, Al, Ga, In, Si, Ge, Sn, Pb, Sb, Bi, Ti, V, Cr, Mn, Fe, Co, Ni, Cu, Y, Zr, Nb, Mo, Tc, Ru, Rh, Pd, Ag, Hf, Ta, and W, $2.0 \leq a \leq 5.0$, $0 \leq b \leq 0.5$, and $0.5 \leq c \leq 1.3$. For example, the lithium phosphorus sulfide may be $Li_3PS_4$. Lithium phosphorus sulfide having an ionic conductivity of $10^{-4}$ S/cm or more at room temperature (25° C.) may be used. The metal sulfide may be expressed by $Li_aMS_b$, where M is any one selected from the group consisting of Ti, V, Cr, Mn, Fe, Co, Ni, Cu, Y, Zr, Nb, Mo, Tc, Ru, Rh, Pd, Ag, Hf, Ta, W, magnesium (Mg), Al, Ga, In, Si, Ge, Sn, Pb, arsenic (As), Sb, and Bi, and a and b are real numbers between 0 and 8, respectively. For example, the metal sulfide may be $TiS_2$. The lithium phosphorus sulfide and the metal sulfide may be in a solid state.

As another example, a mixture including lithium sulfide, phosphorus sulfide, metal, and sulfur may be prepared. For example, the lithium sulfide may be $Li_2S$. The phosphorus sulfide may be $P_2S_5$. The metal may be at least one metal of Ti, V, Cr, Mn, Fe, Co, Ni, Cu, Y, Zr, Nb, Mo, Tc, Ru, Rh, Pd, Ag, Hf, Ta, W, Mg, Al, Ga, In, Si, Ge, Sn, Pb, As, Sb, and Bi, and for example, may be Ti. The mixture may be in a solid state.

An electrode composite may be prepared by applying a mechanical force to the mixture (S20). For example, a ball milling process may be performed on the mixture. The metal element (e.g., titanium) and phosphorus element that are included in the mixture may be uniformly distributed by the ball milling process. Lithium phosphorus sulfide included in the mixture may chemically react with metal sulfide by the ball milling process. For example, the lithium element may be inserted into $TiS_2$. As another example, an electrode composite may be prepared by applying thermal energy to the mixture. For example, the lithium element included in the mixture may be inserted into $TiS_2$ by the heat treatment of the mixture. Since the lithium element is inserted into $TiS_2$, lithium metal sulfide (e.g., $Li_xTiS_2$) and amorphous sulfide may be prepared. The lithium metal sulfide may be crystalline. The amorphous sulfide may include lithium, metal, phosphorus, and sulfur. For example, the amorphous sulfide may be $Li_x$-$TiP_yS_z$ ($0.001 \leq x \leq 10$, $0.001 \leq y \leq 5$, $0.001 \leq z \leq 20$). A portion of the lithium phosphorus sulfide included in the mixture may not react and may remain. As a result, the electrode composite of the present invention may include lithium phosphorus sulfide, lithium metal sulfide, and amorphous sulfide. The electrode composite according to an embodiment of the present invention may be expressed by $Li_aPM_bS_cX_d$, where M is any one selected from the group consisting of B, Al, Ga, In, Si, Ge, Sn, Pb, Sb, Bi, Ti, V, Cr, Mn, Fe, Co, Ni, Cu, Y, Zr, Nb, Mo, Tc, Ru, Rh, Pd, Ag, Hf, Ta, and W, X is any one selected from the group consisting of fluorine (F), chlorine (Cl), brome (Br), and iodine (I), and a, b, c, and d may be each independently real numbers between 0 and 6.

A lithium battery may be formed by using the electrode composite (S30). For example, a pressure may be applied to a mold into which the electrode composite is introduced. As a result, a first electrode active layer 110 may be formed. The shape, size, and preparation method of the first electrode active layer 110 may be varied. As illustrated in FIG. 1, the first electrode current collector 100 may be formed on the one side 110a of the first electrode active layer. The solid electrolyte layer SE may be formed on another side 110b of the first electrode active layer. The second electrode active layer 210 and the second electrode current collector 200 may be formed on the solid electrolyte layer SE to be space apart from the first electrode active layer 110. The sequence of forming the first electrode current collector 100, the first electrode active layer 110, the solid electrolyte layer SE, the second electrode active layer 210, and the second electrode current collector 200 is not limited thereto and may be varied. The first electrode current collector 100, the first electrode active layer 110, the solid electrolyte layer SE, the second electrode active layer 210, and the second electrode current collector 200 may be the same or similar to those described in the example of FIG. 1.

Figure 4:
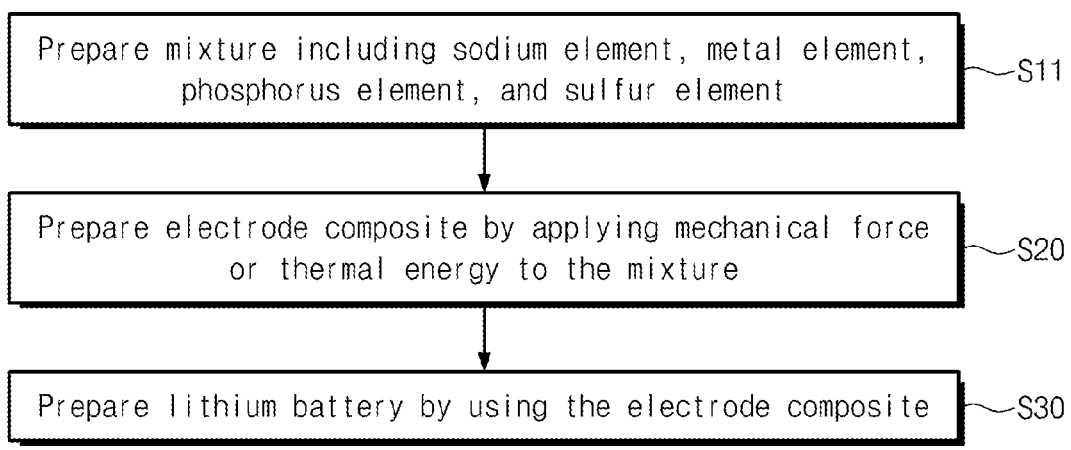
FIG. 4 is a flowchart illustrating a method of preparing a lithium battery according to another embodiment of the present invention.

FIG. 4 is a flowchart illustrating a method of preparing a lithium battery according to another embodiment of the present invention. Hereinafter, descriptions overlapping with the aforementioned descriptions will be omitted.

Referring to FIG. 4, a mixture including a sodium element, a metal element, a phosphorus element, and a sulfur element may be prepared (S11). For example, sodium phosphorus sulfide and metal sulfide may be added to prepare the mixture. In this case, the metal sulfide may be expressed by $Na_aMS_b$, where M is any one selected from the group consisting of Ti, V, Cr, Mn, Fe, Co, Ni, Cu, Y, Zr, Nb, Mo, Tc, Ru, Rh, Pd, Ag, Hf, Ta, W, Mg, Al, Ga, In, Si, Ge, Sn, Pb, As, Sb, and Bi, $0 \leq a \leq 8$, and $0 \leq b \leq 8$. The mixture may be in a solid state.

An electrode composite may be prepared by applying a mechanical force or thermal energy to the mixture (S20). The electrode composite according to an embodiment of the present invention may be expressed by $Na_aPM_bS_cX_d$, where M is any one of B, Al, Ga, In, Si, Ge, Sn, Pb, Sb, Bi, Ti, V, Cr, Mn, Fe, Co, Ni, Cu, Y, Zr, Nb, Mo, Tc, Ru, Rh, Pd, Ag, Hf, Ta, and W, X is any one selected from the group consisting of F, Cl, Br, and I, and a, b, c, and d may be each independently real numbers between 0 and 6. For example, a ball milling process may be performed on the mixture. The ball milling process may be performed by the same or similar method to the ball milling process described in the example of FIG. 1 before. As another example, the electrode composite may be prepared by the heat treatment of the mixture.

A lithium battery may be formed by using the electrode composite (S30). The preparation of the lithium battery may be performed by the same or similar method to those described in the example of FIG. 3.

Hereinafter, the preparation of the electrode composite according to the present invention and the results of the characterization of the electrode composite will be described in more detail with reference to experimental examples of the present invention.

Preparation of Electrode Composite

Experimental Example 1-1

100 mg of a mixture was prepared by mixing $TiS_2$ and $Li_3PS_4$ at a weight ratio of 1:2. The mixture was provided to a reactor having a volume of 25 ml. $ZrO_2$ balls having a diameter of 5 mm were provided to the reactor. A ball milling process using the $ZrO_2$ balls was performed on the mixture in the reactor. The ball milling process was performed at 2,000 rpm for 10 minutes.

Experimental Example 1-2

An electrode composite may be prepared. However, in the present example, 100 mg of a mixture was prepared by mixing $TiS_2$, $Li_2S$, and $P_2S_5$ at a molar ratio of 1:4.3:2.2. The mixture and $ZrO_2$ balls having a diameter of 5 mm were provided to a reactor. A ball milling process using the $ZrO_2$ balls was performed on the mixture in the reactor. The ball milling process was performed at 500 rpm for 10 hours.

Comparative Example 1

An electrode composite may be prepared. However, in the present example, a ball milling process may be omitted. For example, 100 mg of a mixture, which was prepared in the same manner as in Experimental Example 1-1, may be mixed without using a ball milling process.

Preparation of Lithium Battery

Experimental Example 2-1

200 g of $Li_3PS_4$ was introduced into a cylindrical mold having a diameter of 13 mm. A solid electrolyte pellet was prepared by applying a pressure of 360 MPa to the cylindrical mold. 10 g of the electrode composite prepared in Experimental Example 1-1 was provided to a first side of the solid electrolyte pellet. A cathode was formed on the first side of the solid electrolyte pellet by applying a pressure of 360 MPa to the cylindrical mold including the electrolyte composite. A lithium foil was stacked on a second side of the solid electrolyte pellet. The second side of the solid electrolyte was opposite to the first side. An anode was formed on the second side of the solid electrolyte pellet by applying a pressure of 30 MPa to the lithium foil.

Experimental Example 2-2

A lithium battery was prepared in the same manner as in Experimental Example 2-1 except that the electrode composite prepared in Experimental Example 1-2 was used in the present example.

Comparative Example 2-1

A lithium battery was prepared in the same manner as in Experimental Example 2-1 except that the electrode composite prepared in Comparative Example 1 was used in the present example.

Figure 5:
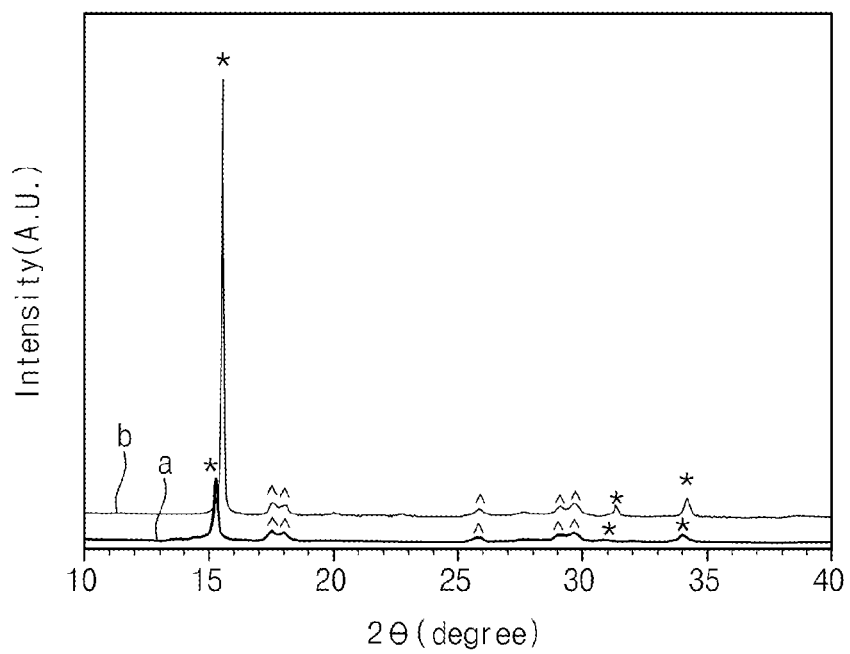
FIG. 5 is a graph illustrating the results of X-ray diffraction analysis of Experimental Example 1-1 and Comparative Example 1.

FIG. 5 is a graph illustrating the results of X-ray diffraction analysis of Experimental Example 1-1 and Comparative Example 1. a represents the result of the analysis of Experimental Example 1-1 and b represents the result of the analysis of Comparative Example 1.

Referring to FIG. 5, Experimental Example 1-1 exhibited $TiS_2$ peaks (*) having a lower intensity than $TiS_2$ peaks (*) of Comparative Example 1. A lithium element included in the mixture may be inserted into $TiS_2$ crystals by the ball milling process. As a result, $TiS_2$ of the solid electrolyte of Experimental Example 1-1 may have a smaller crystal size than $TiS_2$ of the solid electrolyte of Comparative Example 1.

It may be understood that the $TiS_2$ peaks (*) of Experimental Example 1-1 were positioned on the left of the $TiS_2$ peaks (*) of Comparative Example 1. Since a mechanical force, such as a ball milling process, was applied to the mixture, $Li_3SP_4$ included in the mixture may be reacted with $TiS_2$. As a result, with respect to Experimental Example 1-1, a lattice structure different from pure $TiS_2$, for example, a lattice structure of $TiS_2$, into which the lithium element was inserted, may be formed.

Peaks (^) of $Li_3SP_4$ were observed in Experimental Example 1-1. Thus, it may be understood that $Li_3SP_4$ included in the mixture did not react and remained in the electrode composite. It may be confirmed that $Li_3SP_4$ acting as an ion transfer path was included in the solid electrolyte prepared according to Experimental Example 1-1.

Figure 6:
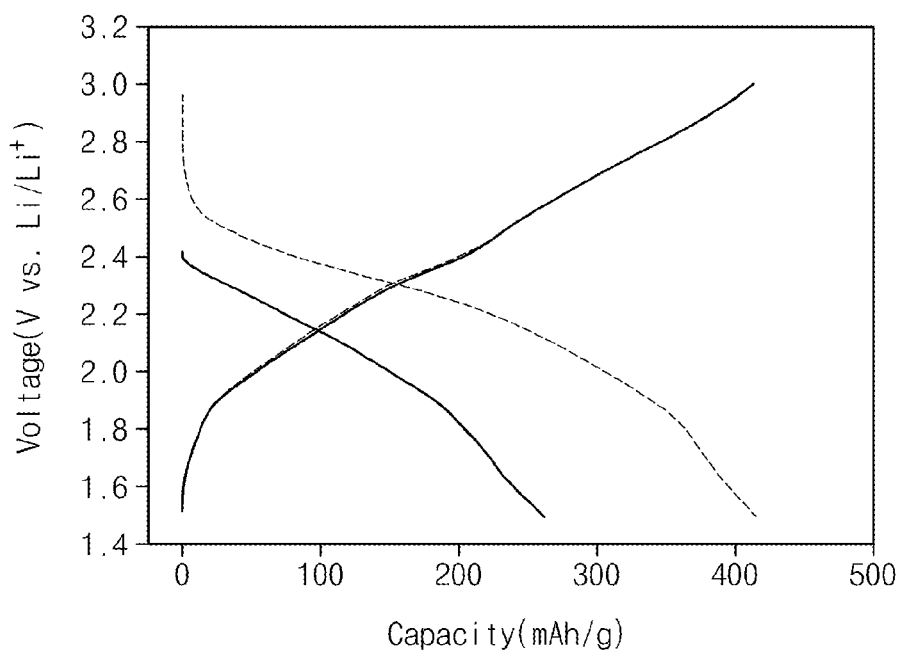
FIG. 6 is a graph illustrating the result of evaluating charge and discharge characteristics of Experimental Example 2-1 in a voltage range of 1.5 V to 3.0 V.
Figure 7:
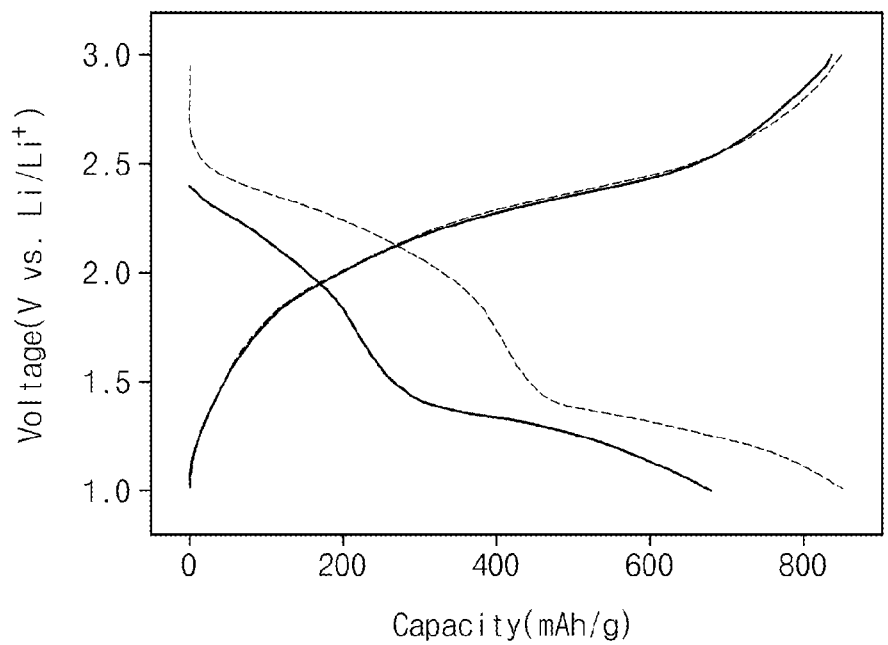
FIG. 7 is a graph illustrating the result of evaluating charge and discharge characteristics of Experimental Example 2-1 in a voltage range of 1.0 V to 3.0 V.

FIG. 6 is a graph illustrating the result of evaluating charge and discharge characteristics of Experimental Example 2-1 in a voltage range of 1.5 V to 3.0 V. FIG. 7 is a graph illustrating the result of evaluating charge and discharge characteristics of Experimental Example 2-1 in a voltage range of 1.0 V to 3.0 V. The charge and discharge characteristics of FIGS. 6 and 7 were evaluated under the conditions of a temperature of 30° C. and a current rate of 0.1 C. The horizontal axis represents capacity and the vertical axis represents voltage. A dotted line represents measurements during charging and a solid line represents measurements during discharging.

Referring to FIG. 6, Experimental Example 2-1 exhibited a charge capacity of 416 mAhg$^{-1}$ in a second cycle. The charge capacity of Experimental Example 2-1 was greater than a theoretical charge capacity (239 mAhg$^{-1}$) of $TiS_2$.

Referring to FIG. 7, Experimental Example 2-1 exhibited a charge capacity of 810 mAh/g. In this case, it may be understood that the charge capacity of the electrode increased as the voltage applied to Experimental Example 2-1 was decreased.

Table 1 represents charge and discharge capacities and coulombic efficiencies of Experimental Example 2-1 and Comparative Example 2-1. Table 1 was obtained from the results of evaluating charge and discharge characteristics that were illustrated in FIG. 6.

TABLE 1

| | Capacity in the first cycle (mAhg$^{-1}$) | | Coulombic efficiency (%) |
|---|---|---|---|
| | Discharge capacity | Charge capacity | |
| Experimental Example 2-1 | 263 | 416 | 158 |
| Comparative Example 2-1 | 237 | 220 | 93 |

Experimental Example 2-1 exhibited higher charge capacity and coulombic efficiency than Comparative Example 2-1. A theoretical discharge capacity of $TiS_2$ was 239 mAhg$^{-1}$. The lithium battery of Experimental Example 2-1 had a higher charge capacity than the theoretical discharge capacity. The electrode composite of Experimental Example 1-1 prepared by ball milling may include lithium metal sulfide (e.g., $Li_xTiS_2$) and amorphous sulfide (e.g., lithium titanium phosphorus sulfide). The charge capacity and coulombic efficiency of the lithium battery of Experimental Example 2-1 prepared using Experimental Example 1-1 may be more improved.

Figure 8:
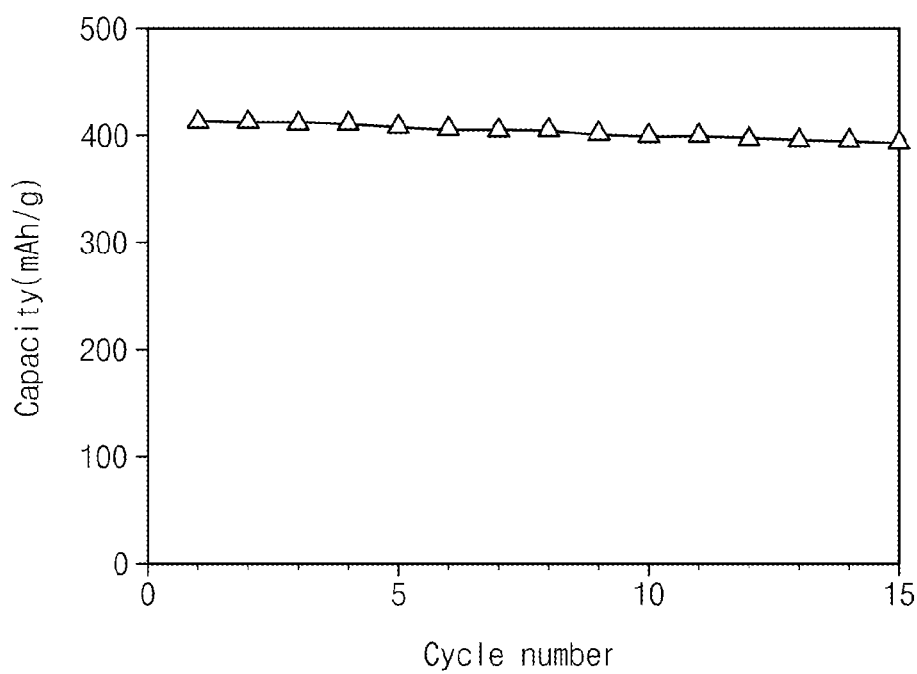
FIG. 8 is a graph illustrating capacity of Experimental Example 2-1 in a voltage range of 1.5 V to 3.0 V according to the number of charge and discharge cycles.

FIG. 8 is a graph illustrating capacity of Experimental Example 2-1 according to the number of charge and discharge cycles.

Referring to FIG. 8, with respect to the lithium battery of Experimental Example 2-1, changes in capacity according to an increase in the number of charge and discharge cycles were low. Thus, it may be confirmed that the lithium battery of Experimental Example 2-1 exhibited excellent cycle characteristics and durability.

According to the present invention, an electrode composite for a lithium battery may be easily prepared by a ball milling process or heat treatment. The electrode composite prepared according to the present invention may include lithium phosphorus sulfide, lithium metal sulfide, and amorphous sulfide. Since the electrode composite includes lithium phosphorus sulfide, ionic conductivity at an interface between an electrode active layer and a solid electrolyte may be improved. Since the electrode composite includes lithium metal sulfide, electronic conductivity at an interface between an electrode current collector and the electrode active layer may be improved. A lithium battery prepared by using the electrode composite may exhibit excellent charge capacity and coulombic efficiency.

While preferred embodiments of the present invention has been particularly shown and described with reference to the accompanying drawings, it will be understood by those of ordinary skill in the art that various changes in form and details may be made therein without departing from the spirit and scope of the present invention as defined by the following claims.

What is claimed is:

1. A method of preparing a lithium battery, the method comprising:
   preparing a mixture including lithium phosphorus sulfide and metal sulfide;
   preparing an electrode composite by applying a physical pressure to the mixture, wherein the electrode composite comprises lithium phosphorus sulfide, lithium metal sulfide, and amorphous sulfide;
   preparing an electrode active layer by using the electrode composite;
   forming an electrode current collector on one side of the electrode active layer; and
   forming a solid electrolyte layer on another side of the electrode active layer.

2. The method of claim 1, wherein the lithium metal sulfide and the amorphous sulfide are prepared by reacting metal sulfide with a lithium element which is included in the mixture, and
   the reacting of the metal sulfide with the lithium element is performed by the physical pressure.

3. The method of claim 1, wherein the lithium phosphorus sulfide included in the electrode composite is provided from a portion of the lithium phosphorus sulfide included in the mixture which does not react and remains.

4. The method of claim 1, wherein the applying of the physical pressure to the mixture is performed by a ball milling process.

5. The method of claim 1, wherein the lithium phosphorus sulfide comprises $Li_3PS_4$, and
   the metal sulfide comprises $TiS_2$.

6. The method of claim 1, wherein the electrode active layer comprises:
   first parts including lithium metal sulfide and electrically connected to the electrode current collector;
   second parts including lithium phosphorus sulfide and connected to the solid electrolyte layer; and
   the amorphous sulfide provided between the first parts and the second parts.

7. The method of claim 1, wherein the amorphous sulfide comprises lithium, metal, phosphorus, and sulfur.

8. A method of preparing a lithium battery, the method comprising:
   preparing a mixture including lithium sulfide, phosphorus sulfide, metal, and sulfur;
   preparing an electrode composite by applying a physical pressure to the mixture, wherein the electrode composite comprises lithium phosphorus sulfide, lithium metal sulfide, and amorphous sulfide;
   preparing an electrode active layer by using the electrode composite;
   forming an electrode current collector on one side of the electrode active layer; and
   forming an electrolyte layer on another side of the electrode active layer.

* * * * *